United States Patent
Roepke et al.

(10) Patent No.: US 12,269,519 B2
(45) Date of Patent: Apr. 8, 2025

(54) MONITORING SYSTEM FOR MONITORING A CONDITION OF AN ELECTRIC RAIL SYSTEM AND/OR OF A CURRENT COLLECTOR OF THE RAIL SYSTEM

(71) Applicant: Aktiebolaget SKF, Gothenburg (SE)

(72) Inventors: Tobias Roepke, Oerlenbach (DE); Lukas Koeping, Würzburg (DE); Horst Niedermeyer, Kolitzheim (DE); Ralph Werner, Dittelbrunn (DE)

(73) Assignee: AKTIEBOLAGET SKF, Gothenburg (SE)

( * ) Notice: Subject to any disclaimer, the term of this patent is extended or adjusted under 35 U.S.C. 154(b) by 1686 days.

(21) Appl. No.: 16/424,649

(22) Filed: May 29, 2019

(65) Prior Publication Data

US 2020/0010100 A1 Jan. 9, 2020

(30) Foreign Application Priority Data

Jul. 6, 2018 (DE) .......................... 102018211175.8

(51) Int. Cl.
*B61L 1/18* (2006.01)
*B61L 1/12* (2006.01)
*B61L 3/18* (2006.01)

(52) U.S. Cl.
CPC ................. *B61L 1/183* (2013.01); *B61L 1/12* (2013.01); *B61L 3/18* (2013.01); *B61L 2205/00* (2013.01)

(58) Field of Classification Search
CPC .... B61L 1/183; B61L 1/12; B61L 3/18; B61L 2205/00; B60L 2250/10; B60L 3/12;
(Continued)

(56) References Cited

U.S. PATENT DOCUMENTS 2,939,405 A * 6/1960 Krohn-Holm .......... B61B 12/02
105/148
3,828,684 A * 8/1974 Figari ..................... B61B 13/06
104/89
(Continued)

FOREIGN PATENT DOCUMENTS

CN 1898103 A 1/2007 ............. B60M 1/28
CN 101784887 A 7/2010 ............. G01N 21/89
(Continued)

OTHER PUBLICATIONS

CN 207173312 (translation of abstract and claim) (Year: 2018).*
(Continued)

*Primary Examiner* — S. Joseph Morano
(74) *Attorney, Agent, or Firm* — J-TEK LAW PLLC; Scott T. Wakeman; Mark A. Ussai

(57) ABSTRACT

An electric rail system includes a current collector mounted for movement along at least one rail of the electric rail system and a monitoring system for detecting a condition indicative of a problem with the rail system or the current collector. The monitoring system includes a detector having one or more of: a camera configured to record images of a portion of the rail system in front of or behind the current collector, at least one vibration sensor on at least one slip contact of the current collector, an optical spark sensor configured to detect sparks in a contact region between the slip contact and the at least one rail, and at least one distance sensor configured to detect a distance between the at least one distance sensor and the at least one rail.

13 Claims, 1 Drawing Sheet

(58) Field of Classification Search
CPC ...... B60L 5/10; B60L 5/39; B60L 5/04; B60L 5/08; B60L 5/00; B60L 2270/145; B60L 2260/40; G01D 21/02; G01B 11/14; G01N 21/84; G01N 21/88; G01R 31/1218; B60R 21/01516
See application file for complete search history.

(56) References Cited

U.S. PATENT DOCUMENTS

| | | | | |
|---|---|---|---|---|
| 5,819,189 | A | * 10/1998 | Kramer | B61L 23/005 |
| | | | | 700/229 |
| 8,666,553 | B2 | * 3/2014 | Phillips | B60K 16/00 |
| | | | | 901/1 |
| 2003/0036835 | A1 | * 2/2003 | Breed | G06V 40/10 |
| | | | | 701/45 |
| 2005/0087090 | A1 | * 4/2005 | MacDonald | F16M 11/425 |
| | | | | 104/112 |
| 2007/0000744 | A1 | 1/2007 | Craig et al. | |
| 2010/0322465 | A1 | 12/2010 | Wesche et al. | |
| 2014/0032028 | A1 | * 1/2014 | Saito | B60L 1/003 |
| | | | | 701/22 |

FOREIGN PATENT DOCUMENTS

| | | | | |
|---|---|---|---|---|
| CN | 102159954 A | * | 8/2011 | ............... B60L 5/26 |
| CN | 102466490 A | | 5/2012 | ............... G01D 5/165 |
| CN | 202372451 U | * | 8/2012 | |
| CN | 207173312 U | * | 4/2018 | |
| DE | 102009006392 A1 | | 7/2010 | |
| DE | 102014226694 A1 | | 12/2015 | |
| EP | 2249122 A1 | | 11/2010 | ............. G01B 11/25 |
| EP | 2312269 A1 | * | 4/2011 | ................ B60L 5/20 |
| JP | 56081063 | * | 7/1981 | |
| JP | S5681063 A | | 7/1981 | ............. H02K 13/00 |
| JP | 2012192759 A | | 10/2012 | |
| JP | 2016192863 A | * | 11/2016 | |
| WO | 2016128053 A1 | | 8/2016 | |

OTHER PUBLICATIONS

CN 202372451 (English translation) (Year: 2012).*
Sunlight Shield (Year: 2011).*
Office Action from the German Patent Office dispatched Sep. 21, 2021 in related German application No. 10 2018 211 175.8, and translation thereof.
Office Action and Search Report from the Chinese Patent Office dispatched Jan. 20, 2023 in related application No. 201910593431. 6, and translation thereof.

* cited by examiner

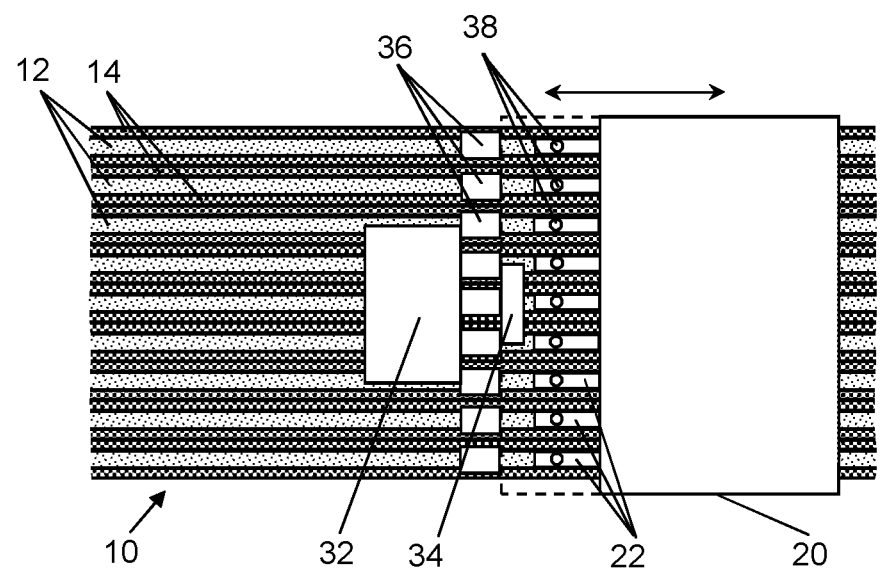

MONITORING SYSTEM FOR MONITORING A CONDITION OF AN ELECTRIC RAIL SYSTEM AND/OR OF A CURRENT COLLECTOR OF THE RAIL SYSTEM

CROSS-REFERENCE

This application claims priority to German patent application no. 10 2018 211 175.8 filed on Jul. 6, 2018, the contents of which are fully incorporated herein by reference.

TECHNOLOGICAL FIELD

The disclosure is directed to a monitoring device of an electric rail system and/or of a current collector of the rail system that is configured to make electrical contact with the rail system and that is movable along the rail system.

BACKGROUND

"Suspension trackways," for example, are known from the prior art wherein a plurality of individually driven electric trolleys travel in series on at least one running rail, which is attached, for example, to an assembly-hall ceiling. Hangers are located on each of the trolleys for receiving a material to be transported or monitored, for example, an automobile to undergo final assembly. Here each of the trolleys comprises a current collector or a current collector bundle that contacts an electric rail system, guided parallel to the running rail, in an electrically conductive manner, whereby a voltage and/or control or regulation feed of the trolley and/or further parts connected to the hangers and/or the trolley is realized. Faults on the current collector, on the rail system, and/or in the contact behavior between the current collector and the rail system can lead to unwanted stoppage of a trolley, which furthermore forces all trolleys to stop and thus stops the entire assembly line along the suspension trackway, which ultimately leads to considerable, very expensive assembly outages proportional to the stoppage time.

SUMMARY

It is therefore an aspect of the disclosure to provide a monitoring device using which such unwanted stoppage time is reducible.

According to the disclosure, a monitoring device of an electric rail system and/or of a current collector of the rail system that makes electrical contact with the rail system and which is movable along the rail system, contains at least one of the following associatively movable detection means:
  a camera for recording images of the rail system in a predefinable region in the movement direction of the current collector in front of or behind the current collector,
  at least one vibration sensor on at least one slip contact of the current collector, which slip contact is provided for making electrical contact with one of the rails of the rail system,
  a spark sensor for an optical spark detection in the contact region, and/or
  at least one distance sensor for at least one rail of the rail system for detecting a distance between an attachment point of the distance sensor and the rail.

Using the camera here anomalies, for example, erosion points of the conductive rail material, e.g., due to lack of slip contact and/or wear phenomena such as an emerging grinding-through of the conductive rail material, for example, a copper- or bronze-alloy, are advantageously recognizable. Said anomalies not being eliminated would lead here sooner or later to the failure of the rail system.

With the vibration sensors provided in particular for each slip contact, for example, continuously occurring vibrations, in particular of certain frequency ranges, are detectable, which vibrations indicate an anomaly of the corresponding slip contact as such or its connection mechanism to the rest of the current collector. Furthermore, unclean transitions from one rail section to the next are detectable, at switches and/or at elevator-type devices of the rail system, which devices are known as lifts, whereby characteristic vibrations are also caused.

The occurrence of sparks is detected using the spark sensor, which can be an indication both of damage or wear phenomena on the rail system and on the contact system of the current collector, as well as in their interaction. Compared to the detection result of the other sensors or of the camera, more precise information is optionally possible. Furthermore if a certain distance difference compared to a normal distance is detected, in particular with distance sensors provided for each rail of the rail system, this can indicate, for example, that the affected rail(s) is (are), for example, not clipped correctly into their mount.

In summary, anomalies of the rail system and/or of the current collector are detectable that can be traced in the next routine maintenance of the rail system and then possibly be eliminated before the anomalies lead to faults that can force an unplanned stoppage of the rail system and of the associated production line. Extremely expensive unplanned production outages can thus be avoided with great advantage.

Further advantages, features and details of the disclosure arise from the exemplary embodiments of the disclosure described in the following with the assistance of the FIGURE.

BRIEF DESCRIPTION OF THE DRAWING

The FIGURE is a plan view of a section of an electric rail system, a current collector configured to electrically connect to the electric rail system and a detector according to embodiments of the disclosure.

DETAILED DESCRIPTION

The FIGURE schematically shows a plan view of a section of an electric rail system 10 on which a current collector 20 movable in the longitudinal direction of the rail system 10 is disposed that contacts the rails 12 in an electrically conductive manner via the slip contacts 22. Here each of the rails 12 is associated with one of the slip contacts 22.

In the rail system 10 the rails 12, which are each provided with their own insulation 14, are disposed one-over-the-other. Of course the rails 12 including their insulation 14 can alternatively be disposed a predefined distance to one another. Here the rails 12 are attached, for example, by being clipped into a mount provided for this purpose. Here the rail system 10 comprises, for example, three current rails for the phases of a three-phase 400 V system, a further current rail having the function of a protective earth (ground) conductor and optionally also as PEN (protective earth neutral), and two further control rails for the transmission of regulation or control signals and/or data generally, for example, measurement data. Here the control rails are configured, for example, for protective low voltage, DC voltage, and/or as a bus, configured, for example, as a PROFIBUS. In other designs there are of course also rail systems without control rails.

Here the rail system 10 can be, for example, a component of a "suspension trackway," on which individually driven trolleys travel on an additional running rail guided parallel to the rail system 10, which running rail, for example, is attached to an assembly-hall ceiling or to an elevated steel structure. Hangers that receive the material to be transported, for example, an automobile to undergo final assembly, are located on the trolleys. Here the rail system 10 serves inter alia for supplying power to and controlling the trolleys and parts connected thereto. Here the current collector 20 is, for example, an integral component of each trolley, and the trolley further comprises rollers on the running rail for rolling, an electromotive output, and regulating components and further components. With such a system in some cases significant longitudinal extensions arise of the suspension trackway, including the rail system, of a plurality of kilometers, for example, in the range of 5 km.

The disclosure is of course also usable with differently designed transport systems, thus, for example, with "skillet" or "push-pallet" systems, wherein the electrical track system, for example, is disposed near the floor or below a floor surface, but also in the field of shelf-storage systems. The disclosure is ultimately usable with all electric rail systems wherein a current collector contacting the rail system is movable along the rail system.

A camera 32 for recording images of the rail system 10 is disposed on the current collector 20 in a predefinable region in the movement direction of the current collector 20 in front of or behind the current collector 10. Furthermore distance sensors 36 are provided on the current collector 20, wherein a separate distance sensor 36 is provided for each rail 12. Here the distance sensors 36 are configured to detect (laser) optically a distance between the attachment point of the respective distance sensor 36 on the current collector 20 and the associated rail 12. In other designs the camera 32 and/or the distance sensors 36 are not disposed on the current collector 20 itself but on a carriage moved together with the current collector 20; the carriage may be, for example, mechanically coupled to the current collector 20.

A vibration sensor 38 is respectively disposed on each of the slip contacts 22, wherein the vibration sensors 38 are configured as acceleration sensors and are each connected to the mount of the slip contact 22 that is movable with the rest of the current collector 20 or flexibly elastically connected thereto. Finally a spark sensor 34 is disposed inside a cover of the current collector 20, which cover is sealed against ambient light influences; the spark sensor 34 is provided for all rails 12 for optically detecting sparks between the rail system 10 and the slip contacts 22, in particular when the current collector 20 is moving. Here the cover of the current collector 20 in the FIGURE is depicted transparent, so to say, and framed with a dashed line in the region wherein the spark sensor 34 but also the slip contacts 22 are disposed, for the recognition of the spark sensor 34 and the slip contacts 22 as well as the vibration sensors 38 disposed thereon.

The images recorded by the camera 32 and/or the data recorded by the sensors 34, 36, and 38 are supplied to a network via a control rail functioning as a bus. Here the bus can be Ethernet-based so that the data exchange takes place via the open industry-Ethernet-standard PROFINET. The images and/or data are then in particular remotely transmitted and remotely evaluated, which can occur in the context of a cloud solution. For the case that the evaluation reveals an anomaly, a corresponding message or warning is returned to the operator of the rail system via the described network. This can range from a simple display on a monitoring screen for the system that contains the rail system or similar up to a message on specific smartphones of specific persons. However, the described network can of course alternatively also include other communication channels, for example, wireless transmission of data via Wi-Fi or mobile phone networks.

Using the camera 32 here anomalies, for example, erosion points of the conductive rail material, e.g., due to lack of slip contact and/or wear phenomena such as an emerging grinding-through of the conductive rail material, for example, from a copper- or bronze-alloy, are advantageously recognizable. Here the images recorded by the camera 32 are supplied to trainable evaluation software for detecting anomalies; the software is trained in particular using images of normal operating states.

If, for example, vibrations of specific frequency ranges occurring continuously are detected by one of the vibration sensors 38, an anomaly of the corresponding slip contact 22 itself or its connection mechanism to the rest of the current collector 20 can be inferred. Furthermore, unclean transitions from one rail section to the next and/or transitions at switches are thus detectable, whereby characteristic vibrations are also caused. Alternatively or additionally thereto one or more acoustic sensors, for example, in the configuration as a microphone, can be used for recording acoustic vibrations.

The occurrence of sparks is detected using the spark sensor 34, which can be an indication both for damage or wear phenomena on the rail system 10 and on the contact system of the current collector 20, as well as in their interaction. Compared to the detection result of the other sensors 36 and 38 or of the camera 32, more precise information is optionally possible.

If a certain distance difference compared to a normal distance is ultimately detected via at least one of the distance sensors 36, this can indicate that the affected rail(s) 12, for example, is (are) not clipped correctly into its (their) mount.

In summary, anomalies of the rail system 10 and/or of the current collector 20 are thus detectable that can be traced in the next routine maintenance of the rail system 10 and then optionally eliminated before the anomalies lead to faults that force an unplanned stoppage of the rail system 10. Extremely expensive unplanned production outages can thus be avoided with great advantage.

In other embodiments it is of course also possible that only some or in the extreme case even only one of the trolleys is equipped in particular with the camera 32 and the distance sensors 36. In turn in other embodiments it is of course also possible to provide vibration sensors 38 and/or distance sensors 36 not for all rails 12, but only for selected ones, for example, of particular relevance to safety. Finally in other embodiments a selection of one, two, or three of the above-described sensor types 34, 36, and 38 or the camera 32 may also be sufficient.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide monitoring devices for electric rail systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. In an electric rail system including a current collector mounted for movement along at least one rail of the electric rail system and configured to draw current from the at least one rail, a monitoring system comprising at least one sensor selected from the group consisting of:
    a camera configured to record images of a portion of the at least one rail in front of the current collector or behind the current collector relative to a movement direction of the current collector along the rail;
    at least one vibration sensor on at least one slip contact of the current collector,
    an optical spark sensor configured to detect sparks in a contact region between the slip contact and the at least one rail, and
    at least one distance sensor configured to detect a distance between the at least one distance sensor and the at least one rail.

2. The monitoring system according to claim 1, wherein the at least one sensor comprises at least two sensors selected from the group.

3. The monitoring system according to claim 1,
    wherein the at least one sensor includes the at least one distance sensor,
    wherein the at least one distance sensor includes a laser, and
    wherein one of the at least one distance sensor is associated with each rail of the at least one rail.

4. The monitoring system according to claim 1,
    wherein the at least one sensor includes the at least one vibration sensor,
    wherein the at least one slip contact includes a first part movably connected to a second part,
    wherein the at least one vibration sensor comprises an acceleration sensor connected to the first part of the at least one slip contact, and
    wherein one of the at least one vibration sensor is connected to each of the at least one slip contact.

5. The monitoring system according to claim 1,
    wherein the at least one sensor comprises the spark sensor,
    wherein the current collector includes a cover and the spark sensor is located inside the cover, and
    wherein the cover is sealed against ambient light influences.

6. The monitoring system according to claim 1, wherein the at least one sensor includes the camera and wherein the camera is a high-speed camera.

7. The monitoring system according to claim 1,
    wherein the data recorded by the at least one sensor is transmitted over a network to a controller including a microprocessor and wherein the controller is configured to detect an anomaly in the data and produce an anomaly signal in response to the detected anomaly.

8. The monitoring system according to claim 7, wherein the at least one sensor includes the camera and wherein data recorded by the camera are supplied to trainable evaluation software for detecting anomalies, which software is trained using images of normal operating states.

9. The monitoring system according to claim 1, wherein the at least one sensor comprises the camera and/or the at least one distance sensor and wherein the camera and/or the at least one distance sensor are mounted on the current collector or on a carriage configured to move together with the current collector.

10. The monitoring system according to claim 1,
    wherein the at least one rail comprises a first rail and as second rail,
    wherein the at least one sensor includes the at least one vibration sensor,
    wherein the at least one slip contact of the current collector comprises a first slip contact configured to contact the first rail and a second slip contact configured to contact the second rail, and
    wherein the at least one vibration sensor comprises a first vibration sensor on the first slip contact and a second vibration sensor on the second slip contact.

11. The monitoring system according to claim 1,
    wherein the at least one rail comprises a first rail and as second rail,
    wherein the at least one sensor includes the at least one distance sensor, and
    wherein the at least one distance sensor comprises a first laser configured to measure a distance to the first rail and a second laser configured to measure a distance to the second rail.

12. In an electric rail system including a current collector mounted for movement along at least one rail of the electric rail system, a monitoring system comprising at least one sensor selected from the group consisting of:
    a camera configured to record images of a portion of the rail system in front of the current collector or behind the current collector relative to a movement direction of the current collector along the rail;
    at least one vibration sensor on at least one slip contact of the current collector,
    an optical spark sensor configured to detect sparks in a contact region between the slip contact and the at least one rail, and
    at least one distance sensor configured to detect a distance between the at least one distance sensor and the at least one rail,
    wherein the rail system comprises a plurality of current rails, insulated from one another, of a direct, alternating, or three-phase system and at least one control rail.

13. In an electric rail system including a current collector mounted for movement along at least one rail of the electric rail system and configured to draw current from the at least one rail, a monitoring system comprising at least one sensor selected from the group consisting of:
    a camera configured to record images of a portion of the at least one rail in front of the current collector or behind the current collector relative to a movement direction of the current collector along the rail;

at least one vibration sensor on at least one slip contact of the current collector, an optical spark sensor configured to detect sparks in a contact region between the slip contact and the at least one rail, and at least one distance sensor configured to detect a distance between the at least one distance sensor and the at least one rail, wherein the at least one sensor comprises the camera and the at least one vibration sensor and the optical spark sensor and the at least one distance sensor, wherein the at least one distance sensor includes a laser, wherein one of the at least one distance sensor is associated with each rail of the at least one rail, wherein the at least one slip contact includes a first part movable connected to a second part, wherein the at least one vibration sensor comprises an acceleration sensor connected to the first part of the at least one slip contact, wherein one of the at least one vibration sensors is connected to each of the at least one slip contact, wherein the current collector includes a cover and the spark sensor is located inside the cover, and wherein the cover is sealed against ambient light influences.

* * * * *